United States Patent [19]
Lakoski et al.

[11] Patent Number: 6,021,894
[45] Date of Patent: *Feb. 8, 2000

[54] FOLDING DATA DISK HOLDER

[75] Inventors: Robert P. Lakoski; Pearce R. Jones; Daniel C. Tagtow, all of Austin, Tex.

[73] Assignee: 3OG, Inc., Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/016,854

[22] Filed: Jan. 30, 1998

Related U.S. Application Data

[63] Continuation of application No. 08/689,903, Aug. 15, 1996, Pat. No. 5,713,463.

[51] Int. Cl.$^7$ ................................................ B65D 85/57
[52] U.S. Cl. .................. 206/308.1; 206/310; 206/493
[58] Field of Search ............................... 206/307–313, 206/308.1, 232, 472, 474, 1.5, 493; 220/339, 4.21–4.23

[56] References Cited

U.S. PATENT DOCUMENTS

| | | |
|---|---|---|
| 1,585,846 | 5/1926 | Frisbie . |
| 3,109,539 | 11/1963 | Turoff . |
| 3,547,342 | 12/1970 | Smith et al. . |
| 3,825,112 | 7/1974 | Schumaker et al. . |
| 3,949,872 | 4/1976 | Paudras . |
| 4,084,690 | 4/1978 | Pulse . |
| 4,235,334 | 11/1980 | Ahn ........................................ 206/387.1 |
| 4,387,807 | 6/1983 | de la Rosa . |
| 4,757,896 | 7/1988 | Huko .................................... 206/387.1 |
| 4,877,130 | 10/1989 | Matuz . |
| 4,903,829 | 2/1990 | Clemens . |
| 4,962,854 | 10/1990 | Ricci ..................................... 206/387.1 |
| 5,011,010 | 4/1991 | Francis et al. . |
| 5,238,107 | 8/1993 | Kownacki . |
| 5,322,162 | 6/1994 | Melk . |
| 5,361,903 | 11/1994 | Thiele ...................................... 206/312 |
| 5,392,906 | 2/1995 | Taniyama .............................. 206/308.1 |
| 5,433,319 | 7/1995 | Tang ....................................... 206/308.1 |
| 5,653,335 | 8/1997 | Bauer et al. .......................... 206/308.1 |
| 5,720,384 | 2/1998 | Wu-Chen .............................. 206/308.1 |

FOREIGN PATENT DOCUMENTS

| | | |
|---|---|---|
| 1362872 | 4/1964 | France . |
| 2587974 | 4/1987 | France . |
| 62-214568 | 9/1987 | Japan . |
| 1116701 | 6/1968 | United Kingdom . |
| 2 226 810 | 7/1990 | United Kingdom . |

*Primary Examiner*—Paul T. Sewell
*Assistant Examiner*—Luan K. Bui
*Attorney, Agent, or Firm*—Akin, Gump, Strauss, Hauer & Feld, L.L.P.

[57] ABSTRACT

A data disk holder for electronic data storage disks such as compact disks (CDs), includes two opposed, generally arcuate planar closure members which are joined together along a base portion by a living hinge. One of the closure members includes a circular flange defining a bore for receiving a boss projecting centrally from the disk support surface of the other closure member, the boss being an interference fit in the bore for securing the closure members together to retain a data disk in the holder. The holder may be injection molded of relatively light weight polypropylene or a similar moldable polymer and may include transverse walls and a double living hinge to provide the jewel box construction and thickness of conventional disk holders.

22 Claims, 3 Drawing Sheets

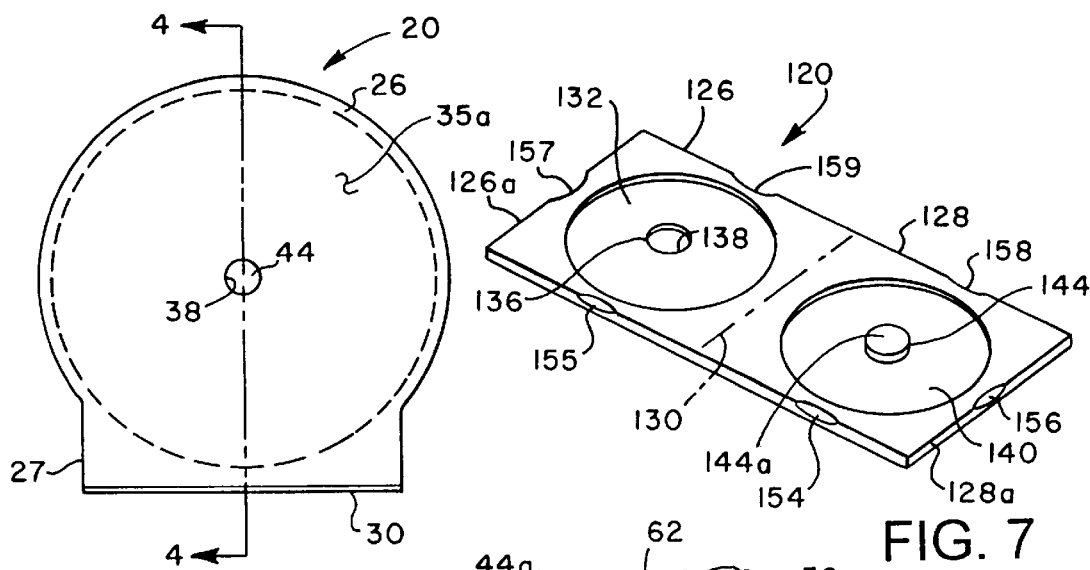
FIG. 3
FIG. 7
FIG. 6
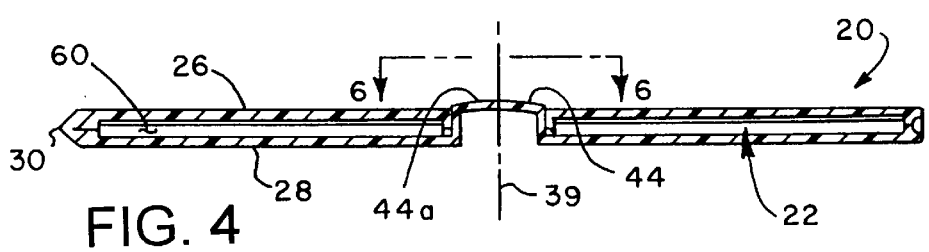
FIG. 4
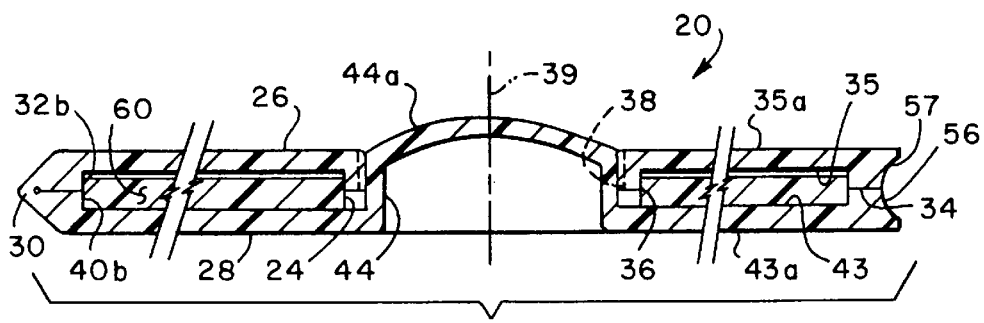
FIG. 5

FOLDING DATA DISK HOLDER

This application is a continuation of application Ser. No. 08/689,903, filed: Aug. 15, 1996, now U.S. Pat. No. 5,713,463.

FIELD OF THE INVENTION

The present invention pertains to a folding holder or container for a data storage disk or "CD" which is characterized by opposed shell like closure members connected by a living hinge and being adapted for substantially one hand operation to open the holder for insertion or removal of a disk.

BACKGROUND

Electronic data storage disks, commonly referred to as compact disks or "CDs" are ubiquitous as a medium for storing computer programs, computer generated data and audio and visual recordings, for example. The proliferation of electronic data disks has pressed the need for improved packaging and storage devices or "holders" which may be conveniently opened and closed to provide for a secure protective storage device for a disk and wherein the holder itself is inexpensive, lightweight and space conserving.

Conventional data disk or CD holders are characterized by the so-called jewel box type wherein a two part, generally rectangular box and cover combination are hinged together to provide storage as well as a display device for displaying the disks at the point of sale. Conventional jewel box data disk or CD holders also require a separate insert within the holder for actually supporting the disk to prevent unwanted movement of the disk while stored in the holder. Conventional disk holders or containers are also somewhat difficult to open and close, somewhat awkward to handle, occupy more space than is desirable and are relatively complex and expensive to manufacture. Accordingly, there has been a need to provide improvements in data disk holders or storage containers and the present invention is directed to a solution to the above-mentioned deficiencies as well as other problems associated with data disk holders or storage containers.

SUMMARY OF THE INVENTION

The present invention provides an improved data disk or "CD" holder or storage container.

In accordance with one important aspect of the invention a data disk holder is provided which is comprised of a single piece of molded plastic comprising opposed somewhat shell-like cover or closure members which are interconnected by a living hinge and which may be moved relative to each other to open and close a disk holding space provided by the closure members. In particular, the data disk holder may be provided with a generally circular shape save for a base portion of the holder which defines the living hinge. The holder is only slightly larger in diameter than the diameter of the disk itself. The holder also has a pleasant feel when being manipulated by the user to place a disk in or remove a disk from the holder due to its substantial roundness or circularity. Moreover, the shape of the holder encourages proper handling of the disk, that is by touching only the edges or the very center portion of the disk and not the portion of the disk on which the data pits or bumps are formed, for example.

In accordance with another aspect of the present invention a data disk holder is provided which is easily manipulated, substantially by one hand, to be opened or closed. The data disk holder has a closure latch comprising opposed center hub portions formed on each shell like closure member and which locate and project through the center bore or hole in the data disk itself. One of the hubs has a bore with surfaces formed thereon to provide an interference fit with the other hub member which is formed as a generally cylindrical boss whereby the opposed closure members may be secured to each other, but may also be easily manipulated to be moved apart to open the holder. The holder also includes uncomplicated but effective surfaces formed on the periphery thereof for manipulation of the closure members to be separated and moved to the holder open position.

The present invention further provides a data disk holder which is economical to manufacture, is lightweight, and may be formed of a transparent or translucent molded plastic material to provide for easy viewing of indicia formed on the disk or on a printed insert which may be disposed on one or both of the closure members. Still further, the opposed closure members are preferably formed with shallow circular recessed surfaces for supporting the disk within the holder in such a way that a disk is less likely to fall out of the holder when the closure members are moved to the holder open position.

Those skilled in the art will further appreciate the above-mentioned advantages and superior features of the data disk holder of the present invention and will recognize other important aspects thereof upon reading the detailed description which follows in conjunction with the drawing.

BRIEF DESCRIPTION OF THE DRAWING

FIG. 3 is a plan view of the holder shown in FIGS. 1 and 2 in the closed position;

FIG. 4 is a section view taken generally along the line 4—4 of FIG. 3;

FIG. 5 is a fragmentary section view on a larger scale, taken from the same line as the view of FIG. 4;

FIG. 6 is a detail view taken generally from the line 6—6 of FIG. 4;

FIG. 7 is a perspective view of a first alternate embodiment of a folding data disk holder in an open position showing the recessed support surfaces of the opposed closure members.

DESCRIPTION OF THE PREFERRED EMBODIMENTS

Figure 1:
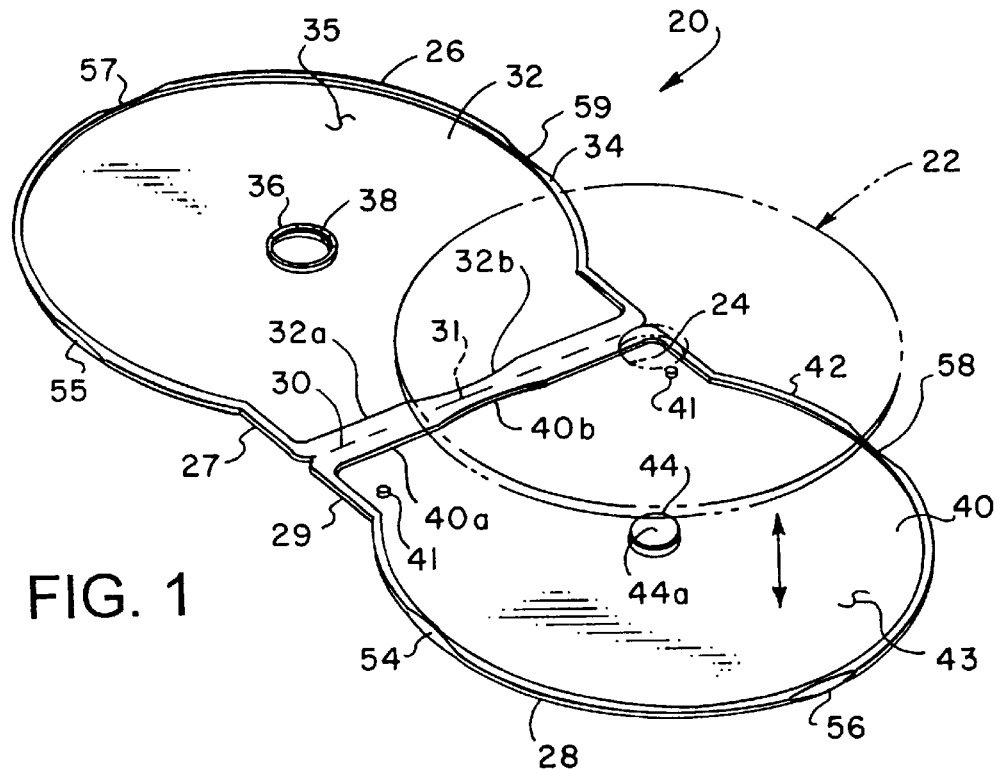
FIG. 1 is a perspective view of the data disk holder of the invention in an open position and showing the recessed support surfaces of the opposed closure members.

In the description which follows like parts are marked throughout the specification and drawing with the same reference numerals, respectively. The drawing figures are not necessarily to scale and certain elements may be shown in somewhat generalized or schematic form in the interest of clarity and conciseness.

Referring to FIG. 1, a folding data disk holder in accordance with the invention is illustrated and generally designated by the numeral 20. The disk holder 20 is adapted to provide a storage and display container for a conventional electronic data storage disk shown in phantom in FIG. 1 and generally designated by the numeral 22. The disk 22 may be of the so-called standard compact disk design having an outside diameter of about 120 millimeters, a central bore 24 of about 15 millimeters and a thickness of about 2.0 to 3.0 millimeters. The disk holder 20 is characterized by opposed shell-like closure members 26 and 28 which are substantially circular in shape save for radially extending and generally rectangular base portions 27 and 29, respectively, which are joined together at a relatively thin web portion 30 to form a "living" hinge having a hinge axis or fold line 31. The closure member 26 includes a recess 32 formed therein and having the general outline of the shape of the closure member 26 and defining a peripheral rim 34. The thickness of the closure member 26 at the rim 34 is preferably about 3.0 millimeters and the depth of the recess 32 is approximately half the total thickness of the closure member.

The closure member 26 further includes a cylindrical hub portion 36 projecting from the recessed support surface 35 of the closure member, which surface delimits the recess 32. The hub 36 is coaxial with the circular periphery of the closure member 26 and the recess 32. The hub 36 is provided with a central bore 38 wherein the hub 36 is essentially a circular flange or collar having a central axis 39, see FIGS. 4 and 5 also. Axis 39 is also the central axis of the circular recess 32 and the periphery of the closure member 26.

Closure member 28 is substantially a mirror image of closure member 26 in the sense that a circular recess 40 is delimited by a rim 42 and the recess 40 is otherwise is defined by the outline of the closure member 28. As shown in FIG. 1, generally transverse linear wall portions 32a and 40a of the recesses 32 and 40 include shallow arcuate portions 32b and 40b for receiving and supporting a portion of a data disk 22. Still further, at least one of the closure members, such as the closure member 40, has spaced apart opposed projections 41 which also aid in locating and supporting the data disk 22 when it is placed in the closure space formed by the recesses 32 and 40 when the closure members 26 and 28 are secured together in such a way that the flanges or rims 34 and 42 are contiguous with each other. The recess 40 is also delimited by a generally planar support surface 43 of the closure member 28. The thickness of the closure member 28 may also be about 3.0 millimeters and the depth of the recess 40 from the rim 42 may be approximately half the total thickness of the closure member 28. Thus, a space is provided between the closure members 26 and 28 when the holder 20 is in the closed position which is at least about 3.0 millimeters thick for receiving the data disk and wherein a slight additional space is provided to receive a paper insert providing suitable indicia or information regarding the disk contained by the holder.

Figure 2:
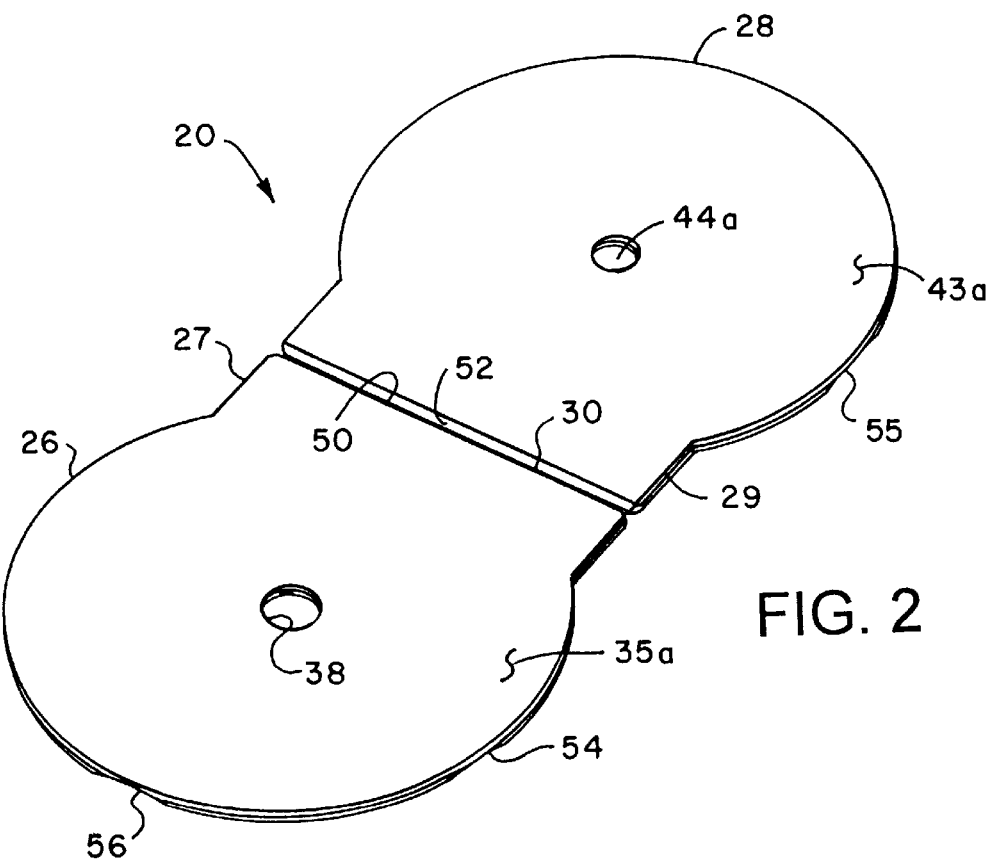
FIG. 2 is a perspective view of the opposite side of the holder shown in FIG. 1.

Referring further to FIGS. 1 and 2, the closure member 28 also has a central coaxial hub portion 44 which has a diameter such as to fit snugly within the bore 38 of the hub 36 when the closure members 26 and 28 are placed contiguous with each other when folded about the hinge 30. The hub 44 is preferably a hollow cylindrical boss projecting normal to the plane of the surface 43. The boss 44 preferably has a transverse wall 44a which projects above the outer surface 35a of the closure member 26 when the holder 20 is in a folded closed condition, see FIGS. 4 and 5.

Referring further to FIG. 2, the hinge 30 is formed by reducing the wall thickness of the base portions 27 and 29 to a suitable thickness for the living hinge 30 by providing opposed bevelled edges 50 and 52 on the respective base portions, as shown. The holder 20 also advantageously includes a plurality of relieved or bevelled surfaces 54, 56 and 58 formed on the closure member 28 preferably spaced 90° apart about the central axis 39 with one surface being at the so-called top of the circular portion of the closure member 28 and opposite the hinge 30. In like manner, closure member 26 has cooperating relieved or bevelled surfaces 55, 57 and 59 formed around the rim 34 and operable to be aligned with the surfaces 54, 56 and 58, respectively, when the closure members 26 and 28 are contiguous with each other in the folded or closed position of the holder 20.

Referring further to FIGS. 3 through 6, in the folded or closed position of the holder 20, the closure members 26 and 28 are positioned contiguous with each other along the peripheral rims 34 and 42 to form an enclosed space 60, FIG. 5, for holding the disk 22. The disk 22 is typically centered within the space 60 by the hub 36 as well as the rims 34 and 42 and the locating pins or bosses 41. In any case, when a disk 22 is placed in the space 60 the disk is substantially prevented from radial movement relative to the axis 39 but a small clearance is provided between one surface of the disk and an inside support surface 35 or 43 of one of the closure members to allow space for placing a paper insert or the like within the space 60.

When the holder 20 is moved to the closed position, the boss 44 projects through the bore 38 and forcibly engages opposed circumferentially spaced surfaces 62, four shown in FIG. 6, which are spaced apart in such a way that opposed ones of the surfaces 62 are spaced from each other a distance slightly less than the diameter of the boss 44. In this way, the boss 44 is interference fitted in the bore 38 to secure the closure members 26 and 28 to each other in the holder closed position shown in FIGS. 3 through 6. However, since the transverse wall 44a of boss 44 projects above outer surface 35a of closure member 26, the boss may be easily digitally pressed out of engagement with the hub 36 to open the holder. Moreover, the opposed bevelled surfaces 54, 55 or 56, 57 or 58, 59 may be engaged by a person's finger tip to aid in separating the closure members 26 and 28 from each other for movement about the hinge 30 to an open position for removing or inserting a disk in the space 60. Normally, however, depressing the boss 44a with the thumb or the like of a person opening the holder 20 will deflect the closure member 28 sufficiently to force the boss out of engagement with the surfaces 62 of the bore 38 to disengage the closure member 26 from closure member 28 and allow movement of the holder 20 to an open position.

The data disk holder 20 is preferably formed of injection molded plastic materials or the like, such as polypropylene, which may be substantially transparent. As shown in FIG. 3, suitable indicia on a data disk or a paper insert therein may easily show through the closure member 26 or 28 to reveal the identity of the disk. Other materials may be used for fabricating the disk holder 20 as well as other embodiments of the holder to be described hereinbelow.

Referring now to FIG. 7, a first alternate embodiment of a data disk holder in accordance with the invention is illustrated and generally designated by the numeral 120. The disk holder 120 includes opposed closure members 126 and 128 which have a generally rectangular configuration and are integrally joined together by a living hinge 130 configured substantially similar to the hinge 30 of the holder 20. The closure members 126 and 128 are provided with respective circular recesses 132 and 140 which have a diameter slightly larger than the aforementioned data disk 22 and are delimited by planar support surfaces 133 and 141, respectively. The disk holder 120 includes a bore 138 formed by a cylindrical flange 136 which is configured similar to the flange 36 and bore 38. In like manner, the closure member 128 includes a cylindrical boss 144 projecting from recess 140 having a transverse end wall 144a. Boss 144 is operable to engage bore 138 in a suitable interference fit to secure the closure members 126 and 128 together to retain a data disk 22 within the holder when it is folded such that the closure members 126 and 128 are contiguous with each other. Suitable finger engageable relieved or bevelled surfaces 156 and 157 are provided in transverse end faces 128a and 126a, as shown, and corresponding surfaces 154 and 158 and 155 and 159 are formed in the side edges of the respective closure members 128 and 126, fulfilling the same purpose as the pairs of relieved surfaces 54, 55 or 56, 57 or 58, 59 of the holder 20. In fact, the holder 120 is similar in most respects to the holder 20 except for the exterior shape, which may have the same dimensions as the conventional jewel box or jewel case disk holder.

Figure 8:
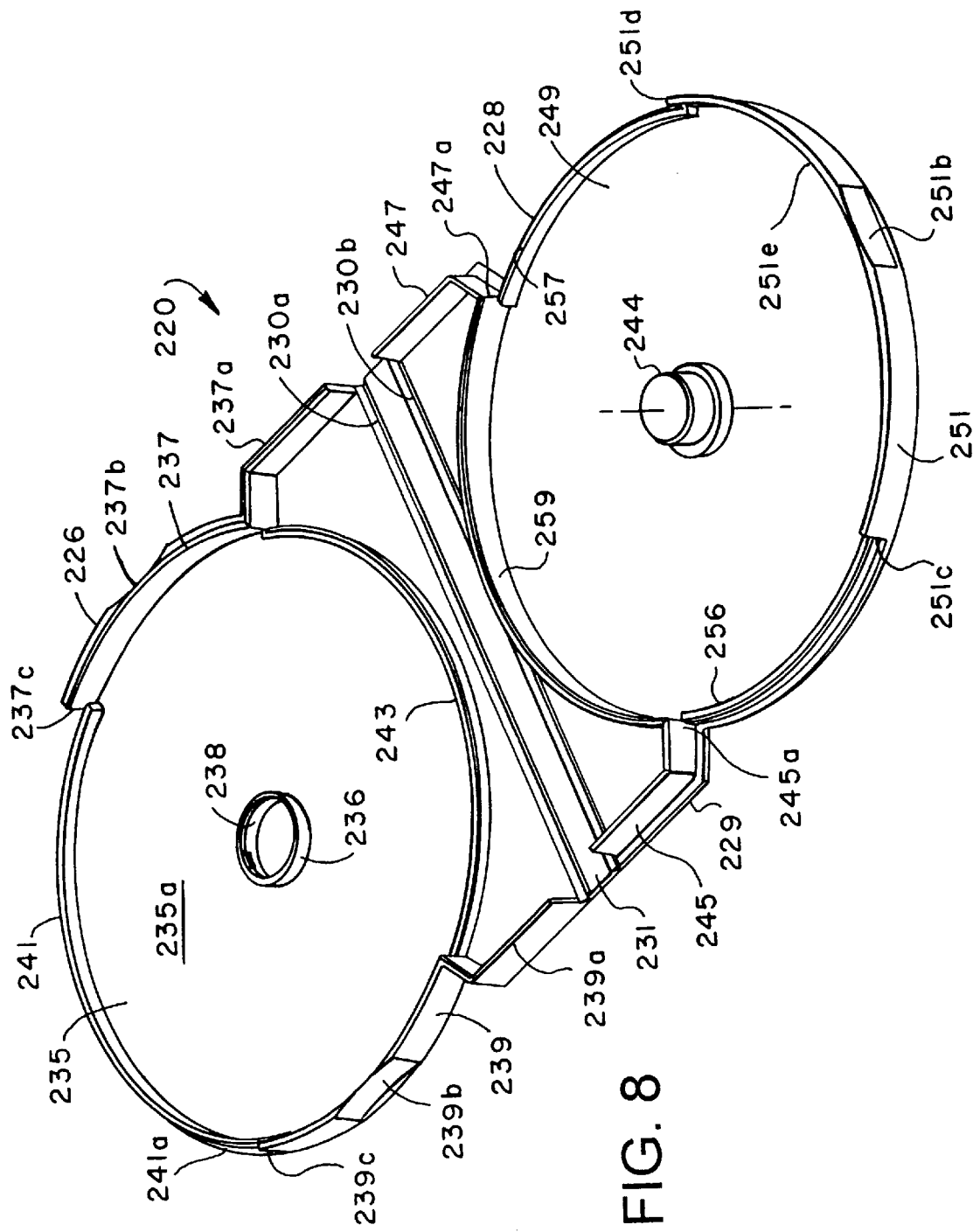
FIG. 8 is a perspective view of a second alternate embodiment of a data disk holder in an open position showing the disk support surfaces and other structural features of the opposed closure members.

Referring now to FIG. 8, another embodiment of a disk holder of the invention is illustrated and generally designated by the numeral 220. The disk holder 220 is preferably constructed to have substantially the thickness of the conventional jewel case or jewel box type disk holder and is characterized by opposed closure members 226 and 228 of generally circular configuration but having somewhat rectangular base portions 227 and 229 which are integrally joined by a double living hinge 230a and 230b interconnected by a generally planar web portion 231 forming a transverse end wall for the holder 220. The closure member 226 includes a generally planar wall portion 235 forming a disk support surface and which is delimited by opposed peripheral arcuate wall portions 237 and 239 having a height approximately equal to the height or width of the web 231. Linear extensions of wall portions 237 and 239 extend along the sides of the base portion 227 and are indicated by numerals 237a and 239a, respectively. A central bore 238 is formed in wall 235 and may also be defined by a circular flange or collar 236 integral with the wall 235. Circular segment wall portions 241 and 243 are substantially contiguous with the wall portions 237 and 239 to define a cylindrical recess 235a for holding one or more data disks 22. The height of wall portions 241 and 243 from wall 235 is approximately half the height of the walls 237 and 239. Walls 237 and 239 also have generally planar inset or recessed surface portions 237b or 239b formed therein, as shown in FIG. 8, for aiding in grasping the closure member 226 to separate it from closure member 228.

Opposed closure member 228 is also generally circular in configuration except for the base portion 229 which has opposed generally planar wall portions 245 and 247. The walls 245 and 247 are inset from the side edges of the base portion 229 to provide for the walls 237a and 239a to overlap the walls 247 and 245, respectively.

Closure member 228 also includes a generally planar wall portion 249 forming a disk support surface and a central cylindrical boss 244 coaxial with respect to the arcuate outline of the closure members 226 and 228. A partial circumferential cylindrical wall portion 251 projects from the surface 249 and is provided with a suitable generally planar recess 251b operable to be engaged by a person's thumb or finger to hold the closure member 228 while the closure member 226 is pivoted away from the closure member 228 to open the holder 220, illustrated in FIG. 8. Closure member 228 is provided with a first arcuate notch 256 defined between the edge 245a of wall 245 and the edge 251c of wall 251. A similar notch 257 is provided between the edge 247a of wall 247 and edge 251d of wall 251. Still further, a recess defined partly by wall 249 and wall 251 is further defined by an arcuate wall 259 which interconnects edges 245a and 257a and is engageable with wall 243 when the closure members 226 and 228 are brought into a position contiguous with each other when the living hinges 230a and 230b are actuated to fold the closure member 226 over the closure member 228 or vice versa. In the closed position of the holder 220, boss 244 projects into and through bore 238 in a manner similar to the way in which boss 44 projects through bore 38 in the holder 20. Still further, the walls 237 and 239 close the notches or gaps 257 and 256, respectively. Walls 259 and 243 are contiguous with each other and wall 241 is nested adjacent to the inner arcuate surface of wall 251 whereby the top edge 251e of wall 251 may register with a planar surface 241a extending around the periphery of wall 241 between transverse edges 237c and 239c of the walls 237 and 239, respectively. Accordingly, a disk is journalled between walls 243 and 241 and between walls 251 and 259 in the closed position of the holder 220. Still further, a disk is also journalled by the boss 244 and the flange 236 in a manner similar to the way in which a disk is retained in the holder 20.

The holder 220 may be operated in a manner substantially like the operation of the holders 20 and 120. A disk, such as a disk 22, may be placed on either one of the closure members 226 or 228 in supported relationship by the closure member walls 235 or 249 and generally centered by the transverse arcuate walls 241 and 243 and the circular flange 236. Alternatively, the disk may be placed on the surface 249 and retained by the boss 244 as well as the arcuate walls 251 and 259.

The closure members 226 and 228 may be moved toward each other for closing the holder 220 wherein in the closed position the walls 237a and 239a overlie and are adjacent to the walls 247 and 245, respectively, and the wall 241 nests within the inner radius of the wall 251. The closure members 226 and 228 are latched to each other by the slight interference fit of the boss 244 in the bore 238. When it is desired to open the holder 220, the boss 244 may be engaged and pushed through the bore 238 while one or more fingers of the hand used to engage the boss may also engage the surfaces 237b, 239b and/or 251b to aid in separating the closure members from each other and swinging them to the open position illustrated in FIG. 8 whereupon a disk may be removed from the holder. The holder 220 may be fabricated in a manner similar to the holder's 20 and 120, that is by forming the holder 220 of injection molded plastic, such as polypropylene or other suitable material.

Although preferred embodiments of an improved data disk holder have been described in detail herein, those skilled in the art will recognize that various substitutions and modifications may be made to the invention without departing from the scope and spirit of the appended claims.

What is claimed is:

1. A holder for a generally circular electronic data storage disk, comprising:

opposed closure members including means for supporting a generally circular data disk on at least one of said closure members;

a living hinge interconnecting said closure members for moving said closure members between an open position for inserting or removing a data disk with respect to said holder and a closed position for retaining said data disk between said closure members;

means for retaining said closure members engaged with each other in the closed position of said holder comprising a bore formed in one of said closure members and a boss formed on the other of said closure members and operable to project into said bore in forcible engagement with said one closure member to retain said closure members in the closed position of said holder; and a major portion of each of said closure members is delimited by a generally circular outer surface and each of said closure members comprises a base portion disposed adjacent a base portion of the other closure member, said base portions being joined by said living hinge.

2. The holder set forth in claim 1 wherein:

said bore in said one closure member is generally cylindrical and includes at least one non-cylindrical surface reducing the effective diameter of said bore for forcible engagement with said boss.

3. The holder set forth in claim 1 wherein:

said bore is formed in a circular flange in said one closure member, said flange having a diameter slightly less than a central circular bore formed in said data disk for journaling said data disk when placed on said one closure member.

4. The holder set forth in claim 1 wherein:

said boss is generally cylindrical and has a transverse end wall projecting from a generally planar surface of said one closure member when said closure members are in the closed position of said holder, said end wall being engageable to push said other closure member away from said one closure member to open said holder.

5. The holder set forth in claim 1 wherein:

said living hinge comprises two, generally parallel living hinges having an integral web interposed therebetween.

6. The holder set forth in claim 5 wherein:

one of said closure members includes spaced apart transverse walls projecting from said base portion of said one closure member and the other closure member includes spaced apart transverse walls projecting from said base portion of said other closure member, said transverse walls of said other closure member being spaced apart farther than said transverse walls of said one closure member so that said transverse walls overlie each other in the closed position of said holder.

7. The holder set forth in claim 6 wherein:

said closure members include arcuate transverse walls interengageable with each other in the closed position of said holder for retaining said data disk in said holder.

8. The holder set forth in claim 1 wherein:

said holder is formed of injection molded plastic.

9. A holder for a generally circular electronic data storage disk, comprising:

opposed closure members for retaining a generally circular data disk between said closure members;

a living hinge interconnecting said closure members for moving said closure members between an open position for inserting or removing a data disk with respect to said holder and a closed position for retaining said data disk between said closure members;

said closure members include recesses formed therein, respectively, forming a space for receiving said data disk when said closure members are in the closed position of said holder, said closure members include peripheral rim portions and cooperating relieved surfaces in said rim portions aligned with each other in the closed position of said holder for digital engagement of said closure members for opening said holder;

means for retaining said closure members engaged with each other in the closed position of said holder; comprising a bore formed in one of said closure members and a boss formed on the other of the closure members and operable to project into said bore in forcible engagement with said one closure member to retain said closures members in the closed position of said holder; and each of said closure members includes a base portion disposed adjacent a base portion of the other closure member, said base portions being joined by said living hinge.

10. The holder set forth in claim 9 including:

spaced apart disk locating members disposed on at least one of said closure members for retaining said disk in a predetermined position on said one closure member.

11. A holder for a generally circular electronic data storage disk, comprising:

opposed closure members for supporting a generally circular data disk between said closure members;

a living hinge interconnecting said closure members for moving said closure members between an open position for inserting or removing a data disk with respect to said holder and a closed position for retaining said data disk between said closure members, said living hinge comprising two, generally parallel living hinges having an integral web disposed therebetween;

means for retaining said closure members engaged with each other in the closed position of said holder comprising a bore formed in one of said closure members and a boss formed on the other of said closure members and operable to project into said bore in forcible engagement with said one closure member to retain said closures members in engagement in the closed position of said holder;

each of said closure members including a base portion disposed adjacent a base portion of the other closure member, said base portions being joined by said living hinge;

one of said closure members including spaced apart transverse walls projecting from said base portion of said one closure member and the other closure member including spaced apart transverse walls projecting from said base portion of said other closure member, said transverse walls of said other closure member being spaced apart farther than said transverse walls of said one closure member so that said transverse walls overlie each other in the closed position of said holder; and one of said closure members including a notch in said transverse wall of said one closure member adjacent a surface for supporting said data disk to provide for digital engagement of said data disk to remove said data disk from said holder when said closure members are in an open position, and the other of said closure members includes a transverse wall forming a closure of said notch in the closed position of said holder.

12. A holder for a generally circular electronic data storage disk, comprising:

opposed closure members including means for supporting a generally circular data disk on at least one of said closure members;

hinge means interconnecting said closure members for moving said closure members between an open position for inserting or removing a data disk with respect to said holder and a closed position for retaining said data disk in said holder;

means on at least one of said closure members projecting through a hole in said data disk and engageable with means on the other of said closure members for securing said closure members in the closed position of said holder comprising a bore formed in one of said closure members and a boss formed on the other of said closure members and operable to project into said bore in forceable engagement with said one closure member to retain said closure members engaged with each other in the closed position of said holder, said bore being generally cylindrical and including at least one noncylindrical surface reducing the effective diameter of said bore for forceable engagement with said boss; and said closure members include generally circular recesses formed therein, respectively, said recesses being delimited by opposed support surfaces and forming a space for receiving said data disk when said closure members are in the closed position of said holder.

13. The holder set forth in claim 12 wherein:

said bore is formed in a circular flange in said one closure member, said flange having a diameter slightly less than said hole in said data disk for journaling said data disk on said one closure member.

14. The holder set forth in claim 12 wherein:

said boss has an end wall projecting from a generally planar surface of said one closure member when said closure members are in the closed position of said holder, said end wall being engageable to push said other closure member away from said one closure member to open said holder.

15. The holder set forth in claim 12 including:

cooperating relieved surfaces formed in the periphery of said closure members for engagement of said closure members to open said holder.

16. A holder for a generally circular electronic data storage disk, comprising;

opposed closure members for retaining a generally circular data disk between said closure members;

a hinge interconnecting said closure members for moving said closure members between an open position for inserting or removing a data disk with respect to said holder and a closed position for retaining said data disk between said closure members;

means for retaining said closure members engaged with each other in the closed position of said holder comprising a bore formed in and projecting through one of said closure members and a boss formed on the other of said closure members and operable to project into said bore in forcible engagement with said one closure member to retain said closure members in the closed position of said holder; and each of said closure members includes a base portion disposed adjacent a base portion of the other closure member, said base portions being joined by said hinge.

17. The holder set forth in claim 16 wherein:

said boss includes a portion which projects through said bore in said one closure member and said boss includes a surface on said portion of said boss which is engageable to press said boss out of said bore to open said holder.

18. The holder set forth in claim 17 wherein:

said boss is adapted to project through a central bore in a data disk disposed between said closure members when said closure members are retaining said data disk therebetween.

19. The holder set forth in claim 16 wherein:

said closure members include peripheral transverse wall portions, respectively, said transverse wall portions overlying each other in a closed position of said holder.

20. The holder set forth in claim 16 wherein:

said hinge comprises a living hinge integrally joining said base portions.

21. The holder set forth in claim 16 wherein:

a portion of each of said closure members is delimited by a generally circular outer surface.

22. A holder for a generally circular electronic data storage disk, comprising:

opposed closure members for retaining a generally circular data disk between said closure members;

a living hinge interconnecting said closure members for moving said closure members between an open position for inserting or removing a data disk with respect to said holder and a closed position for retaining said data disk between said closure members;

means for retaining said closure members engaged with each other in the closed position of said holder comprising a bore formed in one of said closure members and a boss formed on the other of said closure members and operable to project into said bore in forcible engagement with said one closure member to retain said closure members in the closed position of said holder, said boss having a diameter slightly less than the diameter of a central bore in said data disk and projecting through said bore in said data disk when said data disk is retained between said closure members; and a portion of each of said closure members is delimited by a generally circular outer surface and each of said closure members comprises a base portion disposed adjacent a base portion of the other closure member, said base portions being joined by said living hinge.

* * * * *